June 15, 1954     A. MULLER     2,681,402
METHOD OF WELDING ALUMINUM AND ALUMINUM ALLOYS
Filed April 29, 1950     2 Sheets-Sheet 1

INVENTOR
ALBERT MULLER
BY
ATTORNEYS

June 15, 1954   A. MULLER   2,681,402
METHOD OF WELDING ALUMINUM AND ALUMINUM ALLOYS
Filed April 29, 1950   2 Sheets-Sheet 2
FIG.2   FIG.3   FIG.4   FIG.5
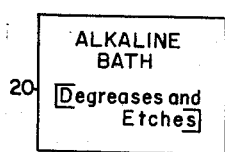
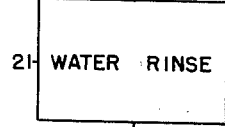
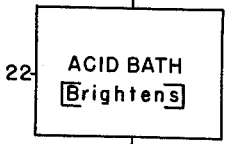
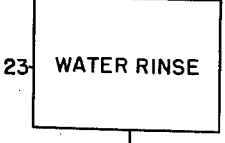
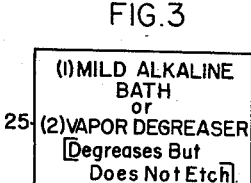
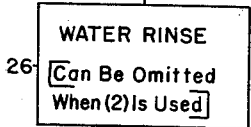
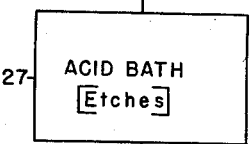
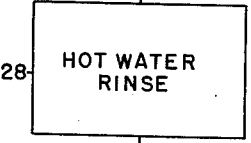
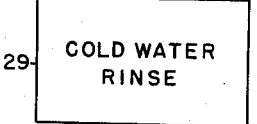
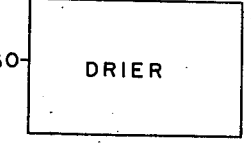
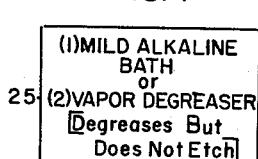
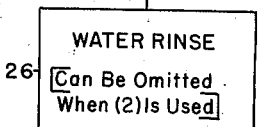
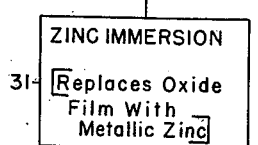
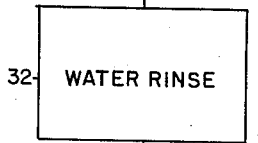
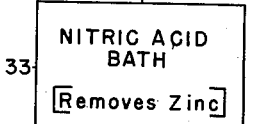
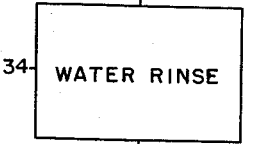
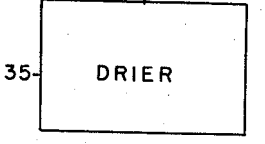
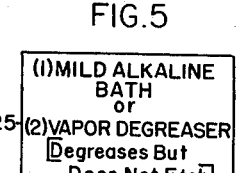
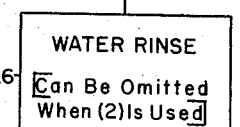
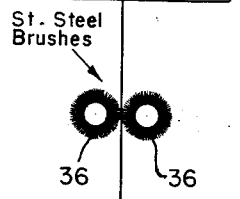
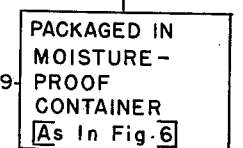
FIG.6
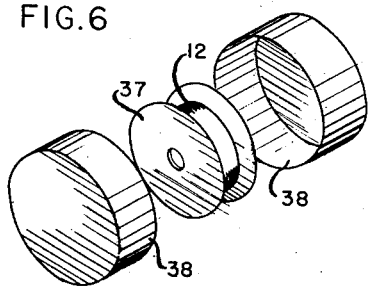
INVENTOR
ALBERT MULLER
BY
ATTORNEYS Patented June 15, 1954

2,681,402

UNITED STATES PATENT OFFICE 2,681,402

METHOD OF WELDING ALUMINUM AND ALUMINUM ALLOYS

Albert Muller, Plainfield, N. J., assignor to Air Reduction Company, Incorporated, a corporation of New York Application April 29, 1950, Serial No. 159,051

5 Claims. (Cl. 219—10)

This invention relates to arc welding, and more particularly to improvements in the welding of aluminum and its alloys by the gas-shielded arc welding method in which a bare aluminum wire is employed as a consumable electrode, the end of the electrode wire being continually melted in the arc and the melted metal being continually transferred through the arc and deposited in the weld while the electrode wire is fed toward the work as fast as it is consumed.

It has been found that with such an aluminum welding method, and especially with one in which the aluminum wire electrode has a small diameter, say from $3/64''$ to $3/16''$, it has been difficult to produce a weld that is not porous. Careful study of the problem has shown that the porosity of the weld metal is due chiefly to the presence of hydrogen. At the temperature of the electric arc hydrogen, water vapor, hydrocarbons, and other hydrogen-bearing compounds in and on the surface film or layer of commercial aluminum wire, readily dissociate to produce hydrogen in atomic or nascent form. Molecular hydrogen is insoluble in either solid or molten aluminum; but atomic hydrogen, although practically insoluble in solid aluminum, is readily soluble in molten aluminum. Therefore, in the arc welding methods generally described herein, hydrogen and hydrogen-bearing compounds dissociate readily at arc welding temperatures and produce atomic hydrogen which dissolves in the molten aluminum. As the molten aluminum cools or freezes, any dissolved hydrogen that may be present is therefore rejected from solution to form bubbles which cause porosity in the solidified weld metal. The study of the problem has also shown that the principal sources of the hydrogen are moisture (water) that may be carried by the aluminum wire electrode either directly on the wire or adsorbed by any oxide film which may be present on the wire, and/or hydrocarbons which may be present on the wire. Commercial aluminum wire has an oxide film on its surface which is often designated as aluminum oxide, although it also includes alumina hydrates and sometimes aluminum hydroxide. There is also usually present on commercial aluminum wire a certain amount of hydrocarbons, such as oil or grease or other lubricants, left thereon from the drawing of the wire. The wire also carries a certain amount of moisture adsorbed by the oxide film because an aluminum oxide of the kind that forms on the aluminum wire has great adsorptive capacity, especially for water vapor. Therefore, commercial aluminum wire provides the two hydrogen sources above mentioned, namely, moisture and hydrocarbons.

I have found that a sound aluminum weld, substantially free from porosity, can be obtained by a gas-shielded arc welding method in which a bare consumable aluminum wire electrode is employed, if the aluminum electrode at the time of welding is substantially free of any substance which would carry hydrogen to the weld and liberate it as atomic hydrogen in contact with the molten aluminum at the welding temperature. According to the invention the commercial aluminum wire used for the electrode in the welding operation is therefore treated prior to its use to remove from it any oxide film, moisture, and hydrocarbons which may be present on it, and precautions are taken to make sure that the aluminum wire is substantially free of any hydrogen-containing compound at the time it is used for welding, either by making use of it before any substantial amount of moisture or moisture-containing oxide film has had time to again form on the wire or by packaging the treated wire in a substantially moisture-proof container and keeping it therein until such time as it is used in the welding operation. Preferably, the workpiece is also treated to remove any hydrogen-containing compounds and oxide film which has adsorbed moisture.

The oxide film per se is not detrimental, except insofar as the presence of oxides interferes with obtaining a sound weld in any welding method, and therefore the presence of a thin oxide film on the aluminum wire at the time of welding is not highly objectionable so far as producing porosity in the weld is concerned, but any substantial amount of moisture adsorbed by the oxide film is undesirable because it is a source of objectionable hydrogen as above stated. As a matter of fact, a thin oxide film begins to form on the aluminum wire immediately after it is treated according to the present invention, but the new film while fresh is very thin and will not adsorb much moisture; furthermore, it does not come in contact with drawing apparatus, and therefore does not pick up oil or grease, and since the treated wire is either used promptly in the welding operation, or is packaged in a substantially moisture-tight or moisture-proof container, the new film does not adsorb enough moisture to liberate an objectionable amount of hydrogen at the time of welding.

Accordingly, one object of this invention is to form a consumable bare electrode for inert gas-shielded arcs by stripping the relatively thick, porous, hydrated oxide film from commercial aluminum wire to provide a fresh relatively thin oxide layer which is substantially continuous, non-hydrated, non-porous and electrically conductive, and free from hydrogen-bearing substances. Preferably the finished wire has a smooth aluminum oxide surface of a thickness of the order of 25 angstrom-units or less and is substantially free of any pits, impurities or foreign matter.

The invention is not limited to any particular manner of treating the aluminum wire to remove the oxide film, moisture, and oil or grease. Several alternative methods of treating the wire will be described hereinafter merely as examples of suitable methods which may be used.

The accompanying drawings illustrate one type of apparatus by which an aluminum welding method of the kind to which the invention pertains can be performed, and further illustrate several examples of wire treating methods that may be employed to remove from the aluminum wire the oxide film and all hyrogen-containing compounds that may be adhering to it. In the drawings:

Figs. 2–5 are flow diagrams of the wire treating methods; and

Fig. 6 is an exploded perspective view showing how the treated aluminum wire may be packaged in a moisture-proof container in cases where it is not to be used right away in the welding operation.

Figure 1:
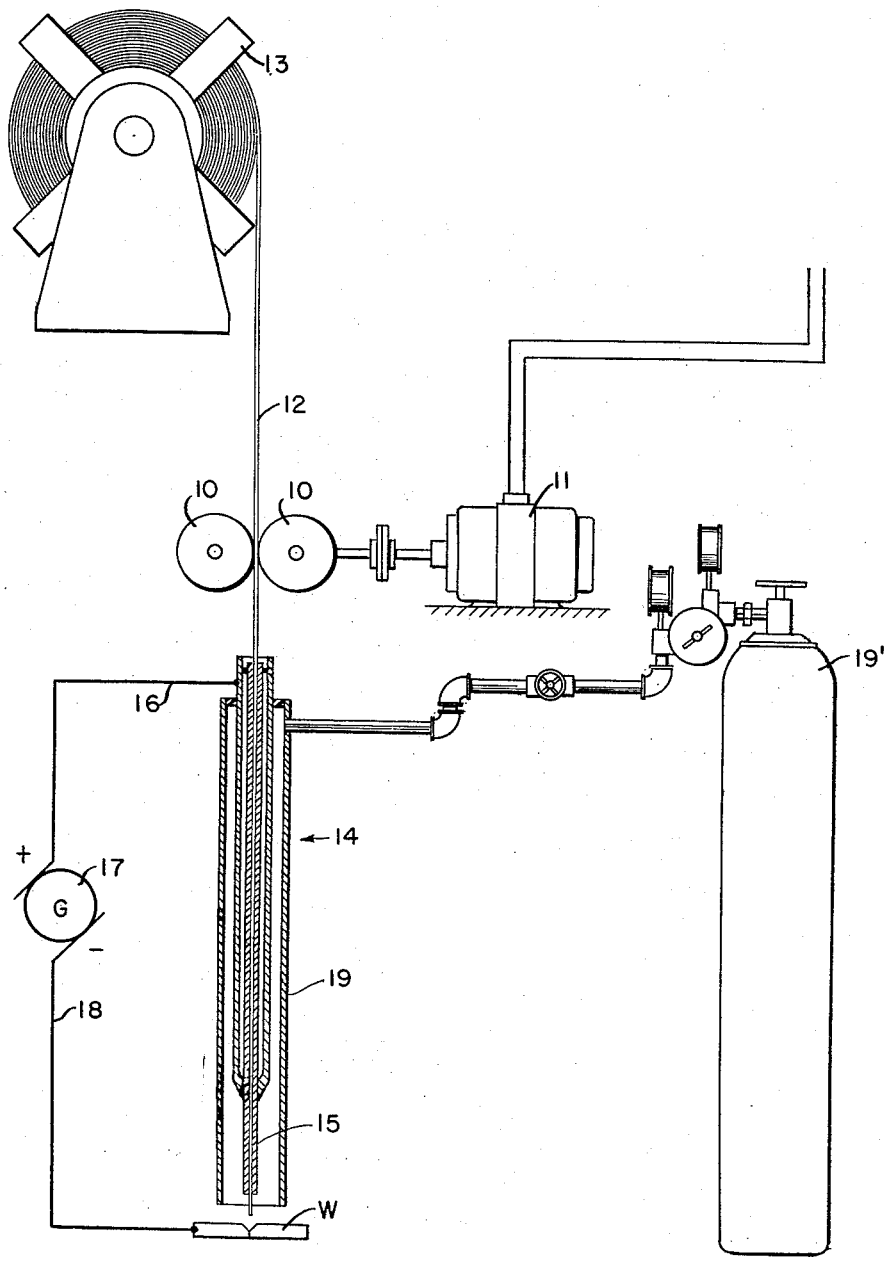
Figure 1 is a diagrammatic representation of the above-mentioned apparatus by which the aluminum welding method may be performed.

Referring first to Fig. 1, an aluminum welding method of the kind to which the invention relates may be performed by apparatus which includes a pair of feed rolls 10 driven by an electric motor 11 for continuously withdrawing an aluminum wire 12 from a reel 13 and feeding it to the welding torch represented at 14. The wire is fed to the current pickup shoe 15 of the welding torch which is connected by a cable 16 to one side of a generator or other source of D. C. welding current represented at 17. The other side of the source of welding current is connected to the aluminum work W to be welded by a cable 18. Thus, an arc may be maintained between the end of the aluminum wire 12 and the work W, the aluminum wire thus serving as the electrode. The end of the aluminum wire continually melts in the arc and the wire is fed toward the work by the feed rolls 10 and the electric motor 11 as fast as it is consumed. The welding is preferably performed with a so-called reverse polarity arc, i. e., the electrode is connected to the positive side of the generator 17 or other source of welding current and the work is connected to the negative side thereof. This assists in dispersing any oxide film on the aluminum work to be welded.

The welding torch includes a nozzle 19 to the interior of which an inert gas such as argon or helium is admitted from a cylinder 19', and which discharges the gas around the tip of the electrode 12, whereby a shielding atmosphere is maintained about the arc and adjacent portions of the work.

In an aluminum welding method of the kind to which the invention pertains the aluminum electrode wire 12 is a bare wire and usually has a small diameter ranging from approximately 3/64" to 1/8". The welding method may be any of the three types known as manual, semi-automatic, and fully automatic. The present invention is particularly useful with a gas-shielded bare wire welding process and apparatus as disclosed in Patent No. 2,504,868, to G. J. Gilbson, N. E. Anderson and myself, issued April 18, 1950, to the assignee of the present application.

In an aluminum welding method of the kind adapted to be performed by apparatus of the type above described and in which a small-size bare aluminum wire is used as a consuming electrode it is particularly important that the aluminum wire at the time of the welding operation be substantially free of moisture and hydrocarbons, as above pointed out. Because of the relatively small size of the aluminum wire electrode the ratio of the surface area to volume is much more than in the larger sizes of wire. This means that a relatively small wire which is fed at a relatively rapid rate toward the work and which is not substantially free of moisture and hydrocarbons, is likely to carry more hydrogen into the weld metal and produce greater porosity in the weld than a relatively large wire, and thus the importance of having the aluminum electrode wire substantially free of these substances increases as the aluminum wire becomes smaller in diameter. Another reason why it is important to have the aluminum electrode wire substantially free of the substances mentioned in an aluminum welding method of the kind described is that in such a method the cooling or freezing rate of the molten aluminum is very rapid so that any hydrogen carried into the weld metal and subsequently liberated from solution has little or no chance to reach the surface of the molten metal and escape before the metal solidifies. The entrapped hydrogen gas causes porosity in the weld metal and has an adverse effect on the mechanical properties of the metal. Entrapment of hydrogen gas is accentuated in cases where the cooling of the weld metal is extremely rapid, which is characteristic of the welding method described herein.

As above stated any suitable method may be employed for treating the aluminum wire to be used as the consuming electrode in the welding operation to remove from it the oxide film, moisture, and hydrocarbons. By way of example, several methods will be described, flow diagrams of which are illustrated in Figs. 2–5, inclusive.

According to the method illustrated by the flow diagram of Fig. 2, the aluminum wire is first treated in an alkaline bath represented at 20 which is of such a nature that it not only removes from the wire any oil or grease which may be on it but it also simultaneously etches the wire which herein means that it removes the oxide film from the wire. The alkaline bath contains particularly sodium carbonate, trisodium phosphate and sodium hydroxide. The solution concentration ranges from one to sixteen ounces of these substances per gallon of water and the solution is used at temperatures ranging from 130° F. to the boiling point. An example of a commercial product suitable for use in producing the alkaline bath is so-called Oakite Stripper. It may be used in the proportion of four ounces per gallon of water and will clean the wire of oil and grease and remove the oxide film in about four minutes at 130° F. After treatment of the wire in the alkaline bath 20 it is subjected to a water rinse 21 to remove any of the alkaline degreasing and etching solution which adheres to the wire. The wire is then placed in an acid bath 22, the primary purpose of which is to brighten the surface of the wire by removing any so-called smut which forms on it as a result of treatment in the alkaline bath 20. The acid bath may be nitric acid, nitric-hydrofluoric acid, or the acid commercially known as Oakite 34 having a chromic acid base. The acid may be used in the proportion of six ounces per gallon of water and may be used at room temperature. About five to ten minutes will be required for this acid treatment. The wire is then subjected to another water rinse 23 to remove any traces of acid and reaction products adhering to the wire, after which it is thoroughly dried in any suitable way as indicated at 24. The resulting wire is free of its original oxide film and is free of moisture and hydrocarbons.

Another method of treating the aluminum wire which may be used is illustrated by the flow diagram of Fig. 3. The principal difference between this method and the one just described is that in the method illustrated in Fig. 3 the initial treatment 25 of the wire is to remove the oil or grease without etching the wire to remove the oxide film. The etching for this purpose is performed as a separate and later step in an acid bath. As shown in Fig. 3 the initial treatment of the wire to remove the oil or grease may be either by means of a mild alkaline bath or a vapor degreaser or cleaner. When a mild alkaline bath is used the bath may contain alkalies such as sodium carbonate, trisodium phosphate, complex phosphates, sodium hydroxide, and sodium silicate, together with an inhibitor to prevent the bath from attacking the aluminum. Examples of inhibitors that may be employed are pyridine ($C_5H_5N$) and aniline ($C_6H_5NH_2$). A specific example of a suitable mild alkaline bath is one containing about 3% each of sodium carbonate and sodium phosphate plus a small quantity of an inhibitor. Such a bath when used at a temperature of 140–180° F. will remove any oil or grease from the wire in from one to three minutes.

If a vapor degreaser is used instead of the mild alkaline bath, it may, for example, be trichlorethylene, perchlorethylene, carbon tetrachloride or benzol. The wire may be treated with the vapor degreaser by suspending the wire in it so that the vapor condenses on the wire and the condensed vapor rinses the surface of the wire free from oil or grease.

The next step in the treatment of the wire is a water rinse 26, but this can be omitted if the removal of the oil and grease has been performed by a vapor degreaser because, as above stated, the vapor which condenses on the wire serves to rinse it free from oil or grease.

After the water rinse the aluminum wire is treated in an acid bath 27 to etch it and remove the oxide film. This acid bath may consist essentially of nitric acid, phosphoric acid and acetic acid. A bath containing these acids may be prepared from either of the commercial products known as Lustrik or Alcoa R5 proprietary solution. The wire is then subjected to a hot water rinse 28 followed by a cold water rinse 29 and is then dried as indicated at 30.

Still another wire treating method that may be used is illustrated by the flow diagram of Fig. 4. The first two steps 25 and 26 of this method may be the same as the first two steps of the method last described to remove the oil or grease and rinse the wire but leave the oxide film on it.

The etching of the wire to remove the oxide film, however, is performed in a different manner than in the method last described. To remove the oxide film the wire is subjected to a zinc-immersion step represented at 31. By this step the original oxide film is removed from the wire surface and replaced with a thin layer of metallic zinc. For this immersion treatment the following solution may be employed:

Caustic soda (commercial 76%) ____ 525 grams
Zinc oxide _____ 100 grams
Water _____ 1 liter The solution is maintained at a temperature of about 68–80° F. It acts on the wire to dissolve the original oxide film, after which an underlying aluminum surface is exposed that starts to dissolve and is immediately replaced by zinc of equivalent weight. The dissolved aluminum replaces sodium and zinc from solutions of their respective salts.

The next step is a water rinse 32 to remove the zinc solution which is rather viscous. The wire is then subjected to a nitric acid bath 33 to remove the zinc deposit, and this is followed by a water rinse 34 to remove any acid and reaction products adhering to the wire. The final step, as in the previous methods is drying the wire as indicated at 35.

Instead of removing the oxide film from the aluminum wire chemically it may be done mechanically, as illustrated in Fig. 5. The oil or grease is first removed from the wire either by a mild alkaline treatment or the use of a vapor degreaser, as in the methods illustrated in Figs. 3 and 4, and the wire is then passed between stainless steel brushes 36 rotated at high speed in contact with the wire so that the oxide film is mechanically worked away.

After the aluminum wire has been treated to remove the oxide film, moisture and hydrocarbons, it is used in the welding operation soon enough after treatment to insure that the wire is still substantially free of moisture (the wire is not likely to be recontaminated with oil or grease, since it is subjected to no further drawing) or the treated wire is wound on a reel shown at 37 in Fig. 6 and then packaged in a moisture-proof container represented at 38 in this figure and kept therein until such time as it is used in the welding operation. When the wire is treated by the method illustrated in Fig. 5, wherein the oxide film is removed mechanically, it is particularly important to package the wire in a moisture-proof container immediately after the oxide film is removed, as indicated at 39 in Fig. 5, because the wire is more susceptible to attack by the atmosphere when the oxide film is removed mechanically than when it is removed chemically.

While the wire has been referred to throughout the foregoing description as an aluminum wire, it will be understood that it may be either pure aluminum or an alloy thereof, for example, an alloy containing 5% of silicon. The term "aluminum" as used in the accompanying claims to designate the kind of wire used in the welding operation, should therefore be construed to include aluminum alloys.

I claim:
1. A consumable electrode method of making an aluminum or an aluminum alloy weld which is substantially free from porosity comprising first treating an aluminum wire to remove therefrom any hydrogen-containing compound such as hydrocarbons and moisture, maintaining the aluminum wire in such hydrogen free condition, and while the aluminum wire is still substantially free of hydrocarbons and before any substantial amount of moisture has been adsorbed by an oxide film thereon using it as the consumable electrode to arc weld by maintaining an electric arc between the end of the wire and an aluminum workpiece, continuously feeding the aluminum wire toward the workpiece and into the arc as it is consumed and while it is still substantially free of any hydrogen-containing compound, and delivering an inert gas to form a shielding atmosphere about the arc and adjacent portions of the workpiece.

2. In a consumable electrode method of making an aluminum or an aluminum alloy weld which is substantially free from porosity including first treating a bare aluminum wire to remove therefrom any hydrogen-containing compound such as hydrocarbons and moisture, establishing and maintaining an electric arc between the end of the aluminum wire and an aluminum workpiece, feeding the aluminum wire toward the workpiece and into the arc as it is consumed, and delivering an inert gas to form a shielding atmosphere about the arc and adjacent portions of the workpiece, the steps of maintaining the aluminum wire in such hydrogen-free condition and continuously feeding the aluminum wire toward the workpiece and into the arc while it is still substantially free of any hydrogen-containing compound.

3. A consumable electrode method of making an aluminum or an aluminum alloy weld which is substantially free from porosity comprising first preparing an aluminum wire free from any hydrogen-containing compound such as hydrocarbons and moisture, maintaining the aluminum wire in such hydrogen-free condition by placing said wire in a moisture-proof container substantially immediately after said preparation thereof, and while the aluminum wire is still substantially free of hydrocarbons and before any substantial amount of moisture has been adsorbed by an oxide film thereon withdrawing it from said container and using it as the consumable electrode to arc weld by maintaining an electric arc between the end of the wire and an aluminum workpiece, continuously feeding the aluminum wire from the container toward the workpiece and into the arc as it is consumed and while it is still substantially free of any hydrogen-containing compound, and delivering an inert gas to form a shielding atmosphere about the arc and adjacent portions of the workpiece.

4. A consumable electrode method of making an aluminum or an aluminum alloy weld which is substantially free from porosity comprising first selecting an aluminum wire free from any hydrogen-containing compound such as hydrocarbons and moisture, maintaining the aluminum wire in such hydrogen-free condition in a moisture-proof container, and while the aluminum wire is still substantially free of hydrocarbons and before any substantial amount of moisture has been adsorbed by an oxide film thereon withdrawing it from said container and using it as the consumable electrode to arc weld by maintaining an electric arc between the end of the wire and an aluminum workpiece, continuously feeding the aluminum wire from the container toward the workpiece and into the arc as it is consumed and while it is still substantially free of any hydrogen-containing compound, and delivering an inert gas to form a shielding atmosphere about the arc and adjacent portions of the workpiece.

5. In a consumable electrode method of making an aluminum or an aluminum alloy weld which is substantially free from porosity including using as a consumable electrode a bare aluminum wire treated to remove therefrom any hydrogen-containing compound such as hydrocarbons and moisture, establishing and maintaining an electric arc between the end of the aluminum wire and an aluminum workpiece, feeding the aluminum wire toward the workpiece and into the arc as it is consumed, and delivering an inert gas to form a shielding atmosphere about the arc and adjacent portions of the workpiece, the steps of maintaining the aluminum wire in such hydrogen-free condition and continuously feeding the aluminum wire toward the workpiece and into the arc while it is still substantially free of any hydrogen-containing compound.

References Cited in the file of this patent

UNITED STATES PATENTS

| Number | Name | Date |
|---|---|---|
| 2,310,308 | Morrison | Feb. 9, 1943 |
| 2,315,466 | Vetter | Mar. 30, 1943 |
| 2,353,786 | Ross | July 18, 1944 |
| 2,365,153 | Stevens | Dec. 19, 1944 |
| 2,475,357 | Miller | July 5, 1949 |
| 2,504,867 | Muller | Apr. 18, 1950 |
| 2,504,868 | Muller | Apr. 18, 1950 |

OTHER REFERENCES

The Welding Journal, October 1944, pp. 487s–493s. (Copy in He-Dig., Division 37.)

The Welding Journal, August 1948, pp. 600–604. (Copy in He-Dig., Division 37.)

The Welding Journal, February 1949, pp. 128–40. (Copy in He-Dig., Division 37.)

Materials and Methods, April 1947, pp. 86–90. (Copy in He-Dig., Division 37.)